W. H. WARD.
GAGE.
APPLICATION FILED MAY 8, 1912.
1,062,525.
Patented May 20, 1913.
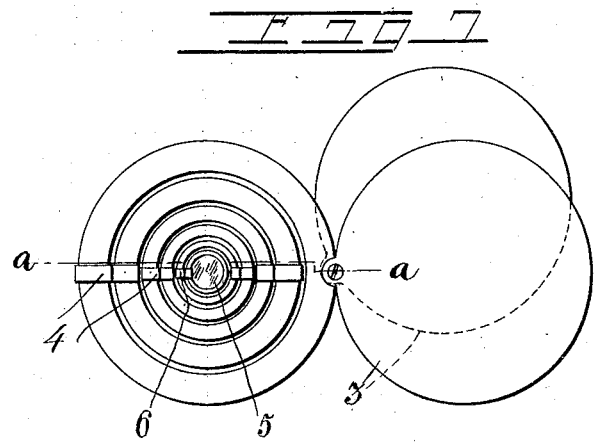
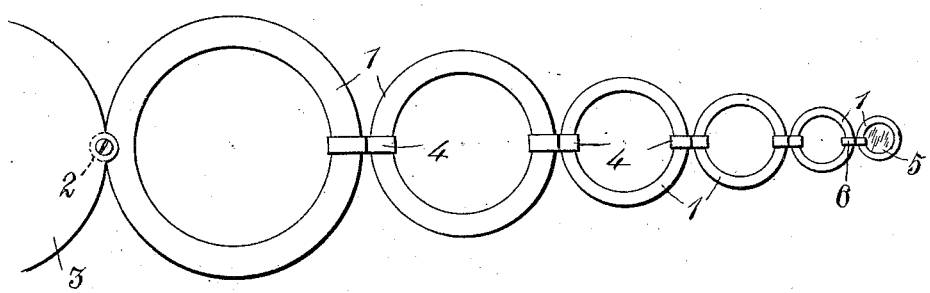
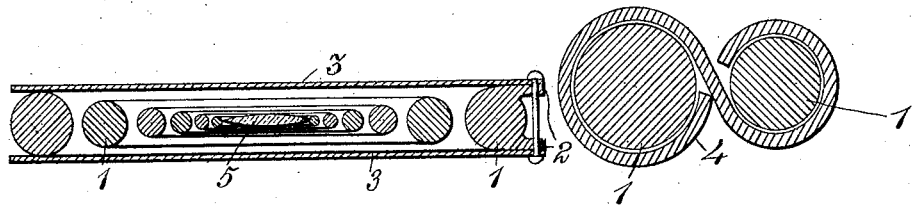
Inventor
W. H. Ward
Witnesses
Raymond L. Gilbert
J. W. Garner
By Victor J. Evans
Attorney

UNITED STATES PATENT OFFICE.

WALTER HENRY WARD, OF SAN JUAN, PORTO RICO.

GAGE.

1,062,525. Specification of Letters Patent. Patented May 20, 1913.

Application filed May 8, 1912. Serial No. 695,923.

*To all whom it may concern:*

Be it known that I, WALTER H. WARD, a citizen of the United States, residing at San Juan, in the island of Porto Rico, have invented new and useful Improvements in Gages, of which the following is a specification.

This invention is an improved gage for measuring building material such as broken stone, gravel and the like, and consists in the construction, combination and arrangement of devices hereinafter described and claimed.

In the accompanying drawings:—Figure 1 is a plan of a gage constructed in accordance with my invention, showing the same folded and representing the cover as swung to one side. Fig. 2 is a similar view of the same, showing the members of the gage in extended or open position. Fig. 3 is a transverse sectional view on the plane indicated by the line $a$—$a$ of Fig. 1. Fig. 4 is a detail sectional view, showing one of the hinge connections between the gage rings.

In accordance with my invention, I provide a series of gage rings 1 which differ only in size and are arranged in series each being of a size adapting it to fold or lie in another next adjacent thereto. In practice, for instance, the largest gage ring will have an inside diameter of two and one-half inches, the next an inside diameter of one and one-half inches, the next an inside diameter of one inch, the next an inside diameter of three-quarters of an inch and the next an inside diameter of one-half an inch and so on. The largest ring is provided on one side with a lug 2 on which are pivoted covers 3 which correspond in size and shape with the largest ring and are adapted to be folded thereover or to be extended therefrom. The next largest ring is connected to the largest at the side opposite the lug 2 by a hinge or link connection 4 which is here shown as a substantially 8-shaped metal strip. Similar strips or hinge links connect the gage rings or members together in series so that they can be folded one within another as shown in Fig. 1 or extended as shown in Fig. 2 and a magnifying glass 5 is connected to the smallest gage ring by means of a similar hinge link 6.

When the gage is in use, the members thereof will be extended as shown in Fig. 2, and when it is not in use, the members thereof should be folded compactly as shown in Figs. 1 and 3. The covers being then closed over opposite sides of the gage, the same may be readily carried in a pocket. The magnifying glass when the gage is folded, is, of course, folded and arranged in the smallest gage ring.

I claim:—

1. A gage of the class described comprising a series of gage rings differing in diameter so that one may be folded or nested in another, and hinge connections between the said gage rings to enable the gage rings to be arranged in extended relation.

2. A gage of the class described comprising a series of gage rings differing in diameter so that one may be folded or nested in another, and hinge connections between the said gage rings to enable the gage rings to be arranged in extended relation, and a cover pivotally connected to the largest gage ring and adapted to be arranged thereon or swung outwardly therefrom.

In testimony whereof I affix my signature in presence of two witnesses.

WALTER HENRY WARD.

Witnesses:
ALBERT B. MCCULLOCH,
ALBERT B. NICHOLS.

---

Copies of this patent may be obtained for five cents each, by addressing the "Commissioner of Patents, Washington, D. C."